July 7, 1964 L. CELLA 3,140,023

AUTOMATICALLY ADJUSTABLE DRESS FORM

Filed June 30, 1961 2 Sheets-Sheet 1

INVENTOR.
Luigi Cella
BY
Roy Griffith Jones
ATTORNEY

AUTOMATICALLY ADJUSTABLE DRESS FORM
Filed June 30, 1961 2 Sheets-Sheet 2
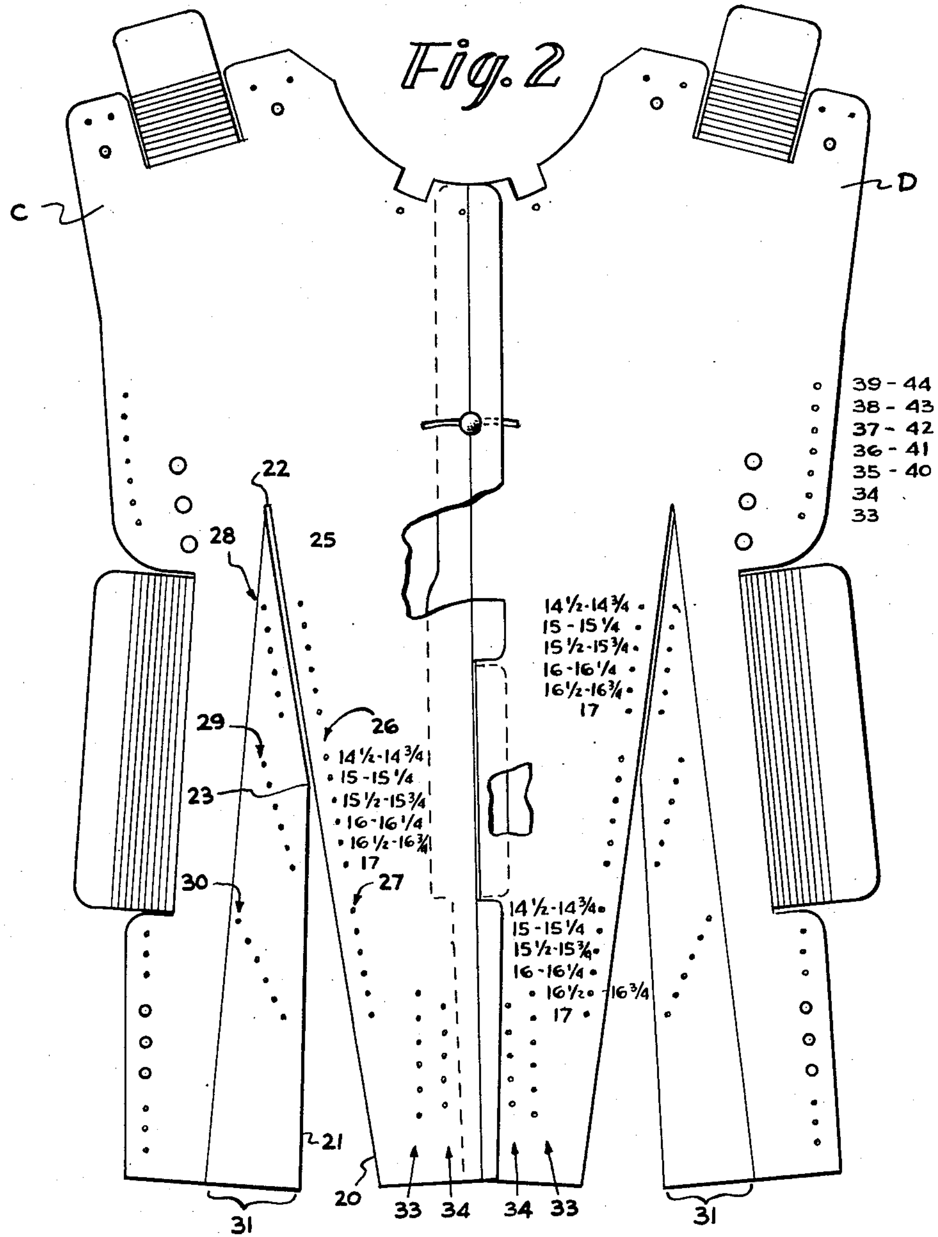
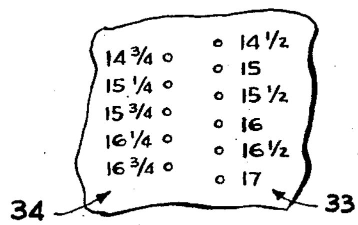
INVENTOR.
Luigi Cella
BY Roy Griffith Jones
ATTORNEY United States Patent Office 3,140,023

Patented July 7, 1964

3,140,023

AUTOMATICALLY ADJUSTABLE DRESS FORM

Luigi Cella, 155 Norman Road, Newark, N.J.

Filed June 30, 1961, Ser. No. 121,254
1 Claim. (Cl. 223—68)

This invention relates to a precision, sectional dress form adjustable for various sizes and proportions, and is an improvement on the ladies' dress form shown in my Patent 2,922,555.

For each dress size, the circumference at the waist line is specified, in addition to that of the bust. But individuals requiring a given dress size differ as to back length, i.e., the length, at the back, from collar bone to waistline. It is therefore important to provide a dress form which, when adjusted to a desired standard dress size, automatically keeps the circumference of the form, at the waistline, correct for any selected back length, and this my present form does.

The drawings illustrate the invention, and in these:

FIGURE 2 is a plan view of two connected back sections of a dress form;

Figure 1:
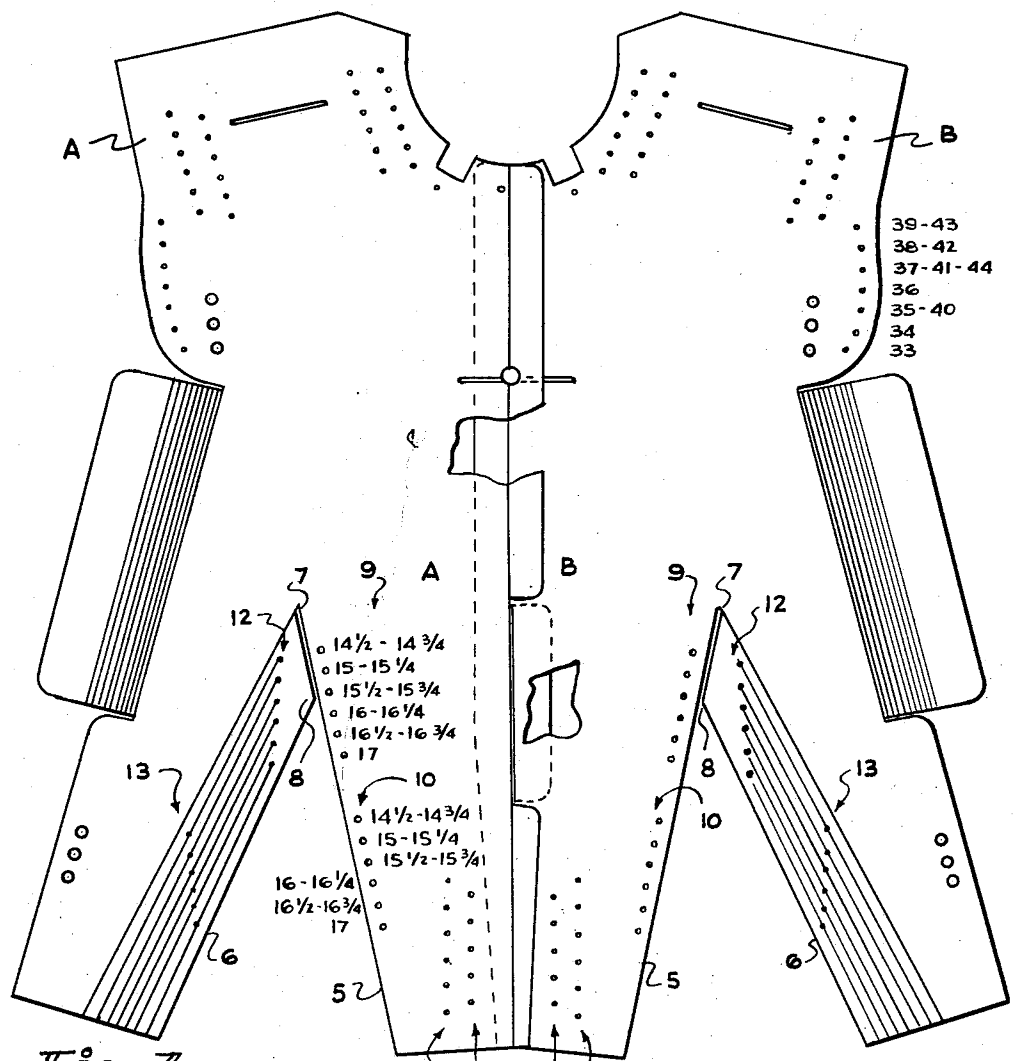
FIGURE 1 is a plan view of two connected front sections of a dress form.
Figure 3:
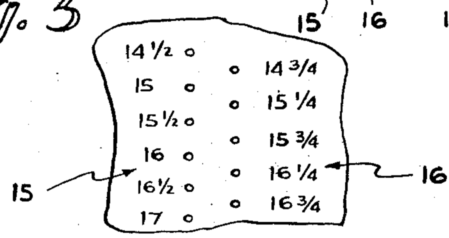

FIGURE 3 is an enlarged view, with numerals indicating sizes, of the two vertical series of holes designated respectively 15 and 16, in the lower right portion of section A of FIG. 1; and FIG. 4 is an enlarged view, with numerals indicating sizes, of the two vertical series of holes designated respectively 33 and 34, appearing in the lower left portion of section D of FIG. 2.

The pair of front sections and the pair of back sections may be used in the dress form of the patent mentioned above, which is preferably made of resilient cardboard.

Referring at first to FIGURE 1, this shows two connected sections A and B. These sections are similar to the corresponding front sections shown in the mentioned patent, except in their lower portions, and in these portions the two sections are similarly formed, so that only the lower portion of one section need be described. Referring to section A, to form a dart, a cut is made along bias lines 5 and 6. Line 5 runs straight from the lower end to point 7, and line 6 runs straight from the lower end to point 8 and then angularly to point 7, to preferably leave a slight space therebetween and line 5. Two aligned, but spaced, linear series of holes 9 and 10, of 6 holes each, are formed adjacent and parallel to line 5, the corresponding holes being labelled with a one-quarter inch range indicating back length. On the opposite side of the dart, to the left of line 6, a series of 6 holes 12 is formed corresponding to the series 9 but at an angle thereto and slightly below; and below series 12, another series 13 of 6 holes is formed, corresponding to the series 10 and about parallel thereto and slightly below. To form the section, that part of it to the right of line 5 is lapped onto the part to the left of line 6, until a given back length, as indicated in series 9 and 10, registers with holes in series 12 and 13 respectively. Fasteners are then placed through the coinciding holes. Section B is then manipulated in he same way, whereupon the front of the form is adjusted for waist size. A series 14 of ray lines are shown drawn through corresponding holes of series 12 and 13, and these lines may, if desired, be labelled similarly to those of series 9 and 10, on one of which ray lines the line 5 may lie, depending on the selected size. These ray lines or the holes may serve as guides showing where the opposite sides of the dart are to be connected, but the holes are also means enabling fasteners to be inserted.

Two vertical, parallel series of holes 15 and 16 are formed in sections A and B, at their lower end portions and adjacent their inner edges. These holes are labelled for back length, and indicate the waist line to which the peplum of the form is to be attached.

Referring now to FIGURE 2, this shows connected back sections C and D, which are to be used, with the described sections A and B, in the bodice of a dress form, as for example, the one referred to. The presently concerned sections are similar to the back sections of the dress form of the mentioned patent, except as to the darts formed, and they are also similar to the described sections A and B, except that the darts are longer, for the purpose of providing for the convexity of the upper back. Moreover, section C is formed similar to section D, so that only C need be described. The dart in C is formed by a cut-out formed between lines 20 and 21, the former being straight and extending from the lower end to point 22, and the latter also extending from the bottom to point 22, but bent at 23 to run closely parallel to line 20 in its upper portion. Three aligned linear series 25, 26 and 27, of six holes each, are formed parallel and adjacent to line 20, and labelled with one-quarter inch ranges, the figures representing back length in inches. To the left of the dart, the section has three linear series of holes 28, 29 and 30, each of six holes, and disposed opposite series 25, 26 and 27 respectively. Series 28 is parallel to series 25, series 29 is at an angle to series 26, and series 30 is at a still larger angle to series 27. The right side of the dart is lapped onto the left side, so that the holes marked by the selected back lengths, as indicated at series 25, 26 and 27, register with corresponding holes in series 28, 29 and 30, after which fasteners are passed through the coinciding holes. A series 31 of ray lines passing through the holes of series 28, 29 and 30 may be marked with back length indicia, if desired, on which lines the edge or line 20 may be laid. Either the ray lines or the holes thereon may serve as guides.

The described formation of sections A, B, C and D, with their darts closed, provide the standard waist circumference for any selected back length. Thus the proper or standard waist line is automatically attained for a given back length, without the need for any tape measurement, the waist circumference being reduced or enlarged by the amount of overlap at the darts.

Two vertical series of holes 33 and 34 are made adjacent the inner edge and bottom portion of the section, and labelled with back length designations, as series 25–28 are, and to which the peplum is to be attached at the selected back length. Sections A and B may be of one piece, and likewise sections C and D, the former pair being called the front and the latter pair the back, of a dress form.

What is claimed is:

In a dress form, a pair of front sections and a pair of back sections, each of said sections having a dart cut-out extending upwardly from its lower end to provide for the formation of darts through a range of overlapping of section portions on opposite sides of the cut-out, each section having a series of holes adjacent one side of its cut-out and an opposite series of holes adjacent the other side of its cut-out, the two series of holes adjacent the cut-out being so arranged that, when a portion of a section on one side of its cut-out is lapped a selected amount onto a section portion on the other side of its cut-out, two holes only, one from each of the two opposed series, will register, the portion of each section on one side of its cut-out having indicia adjacent each hole specifying back length, each of said sections having in its lower end portion a descending series of holes indicating the position of the waist line for different back lengths and for attachment of a peplum, each section having indicia for back length adjacent each hole of said descending series, said descending series of holes arranged so that the waist circumference at the level of the different holes therein is the same for any selected degree of overlapping of section portions on opposite sides of each cut-out.

References Cited in the file of this patent

UNITED STATES PATENTS 2,922,555 Cella ---------------- Jan. 26, 1960